United States Patent Office 3,562,196
Patented Feb. 9, 1971

3,562,196
OLEFIN POLYMER DISPERSION PREPARATION USING OILS AND WAXES AS ANTIFOAMS
Thomas Charles Bissot, Grand Island, N.Y., assignor to E. I. du Pont de Nemours and Company, Wilmington, Del., a corporation of Delaware
No Drawing. Filed July 11, 1968, Ser. No. 743,959
Int. Cl. B01b 1/02; C08f 47/16
U.S. Cl. 260—23                                5 Claims

ABSTRACT OF THE DISCLOSURE

An improved process for the preparation of olefin polymer dispersions, such as ethylene/vinyl acetate copolymer dispersions, is provided. The improvement comprises adding vegetable oils or refined solid or liquid hydrocarbons derived from petroleum such as paraffin waxes or light and heavy mineral oils to suppress foam at a specific time during solvent evaporation.

BACKGROUND OF THE INVENTION

Field of invention

This invention relates to a process for preparing olefin polymer dispersions, and more particularly to foam suppression during solvent evaporation in such preparation.

Prior art

While the use of various fats, oils, waxes and other material products to control foam in various foam-producing situations is old, the elimination or suppression of foam in a particular situation cannot be predicted. What will control foam in one situation will not control it in another.

In the process of preparing polymer dispersions by the solution dispersion method, the foam problem encountered during evaporation of solvent is one of the main technical problems encountered. The patent literature contains references to a variety of techniques used to get around this foam problem.

U.S. Pat. 2,313,144, issued to Albert S. Gomm on Mar. 9, 1943, avoided the foam problem by passing a current of gas over the heated agitated liquid. U.S. Pat. 3,294,728 issued to Alfred Kühlkamp et al. on Dec. 27, 1966, in the preparation of polyolefin dispersions, claimed the use of a cationic surfactant eliminated foam problems of the evaporation operation. U.S. Pat. 3,301,810, issued to Edward A. Hunter et al. on Jan. 31, 1967, in the preparation of isoolefin-multiolefin copolymer dispersions, disclosed the use of dimethyl hexynediol as a foam depressant added just prior or during the stripping operation, while in U.S. Pat. 2,595,797 issued to George F. Leyonmark et al. on May 6, 1952, a polysilicone oil (200) was added to control foam in producing aqueous dispersions of rubber-like plastics.

Furthermore, most of the usual antifoaming agents such as 2-ethyl-1-hexanol and the silicone antifoaming agents are ineffective in reducing the severity of the foaming in the solvent evaporation step of preparing polymer dispersions by the solution dispersion method. Also, the silicone antifoams tend to cause defects in the coatings produced from the dispersions and to adversely affect adhesion properties. It is, therefore, desirable to eliminate this foaming without creating the above-mentioned problems.

SUMMARY OF THE INVENTION

According to the present invention there is provided a process of preparing an olefin polymer dispersion wherein an olefin polymer, such as an ethylene copolymer, is dissolved in at least one water-immiscible solvent, the polymer solution is dispersed in water using an emulsifying agent, and the solvent is evaporated, the improvement comprising: Adding to the dispersion during solvent evaporation from 0.05–5%, preferably 0.3–1.0% by weight, based on the weight of solids, of at least one oil or wax selected from the group consisting of animal fat, vegetable oil, and hydrocarbon mixtures derived from petroleum having a boiling point greater than about 250° C. when the vapor temperature is from about 5–10° C. above the azeotropic boiling point of the solvent-water mixture. Preferred oils and waxes are refined solid or liquid hydrocarbons derived from petroleum such as paraffin waxes or light and heavy petrolatum (mineral oils) and vegetable oils such as cottonseed oil and peanut oil.

DETAILED DESCRIPTION OF THE INVENTION

The process of preparing olefin polymer dispersions by the solution dispersion method can be divided into three separate steps. These are, first, dissolving the polymer in a water-immiscible solvent; second, dispersing this polymer solution in water using suitable emulsifying agents, and third, evaporating off the solvents and sometimes part of the water leaving the polymer alone dispersed in the water. The present invention is concerned only with this last step, which is usually the most difficult and time-consuming operation.

During the evaporation of the solvents from an agitated vessel, most of the solvents distill off at the azeotropic boiling point and composition of the water-immiscible solvent and water. For a single solvent, for example toluene, a toluene-water binary azetrope would be obtained. Preferably, however, the solvent mixture consists of a mixture of a hydrocarbon solvent and a polar liquid. Such solvent mixtures are described in detail in U.S. Pat. 3,296,172 issued Jan. 3, 1967 to D. L. Funck and V. C. Wolff, Jr. The preferred solvent combinations are benzene-isopropyl alcohol and cyclohexane-normal propyl alcohol. With these and similar binary solvent systems, most of the solvents are removed during evaporation as the ternary azeotrope with water.

During that portion of the evaporation when the solvents are distilling off at the azeotropic boiling point and composition, foaming is not severe and good evaporation rates can be maintained. Usually 85–95% of the solvent is removed during this period. During the evaporation of the remainder of the solvent, the vapor temperature rises from that of the azeotropic boiling point to that of boiling water, 100° C., and concentration of the organic components in the distillate decreases from that of the azeotropic composition until only water is obtained. It is during the evaporation of this last fraction of the solvents (5–15% of the total solvents) that a very severe and persistent foam is produced in the evaporator which greatly reduces the rate of solvent removal. However, it has been found that certain oil and molten waxes are highly effective in eliminating or reducing this foaming. These materials may be added in either small increments or continuously when the vapor temperature reaches about 5–10° C. above the azeotropic boiling point of the solvent or solvents-water mixture. Addition of these materials at a lower temperature is not effective and the desired reduction in foam will not be obtained. Similarly, after the boiling point approaches 100° C. and the condensed vapor consists of substantially pure water, these oils and waxes are no longer effective in changing the foam level in the evaporator. Evaporation can be conducted at any pressure, preferably at reduced evaporator pressure or at atmospheric pressure.

A variety of oils and waxes are suitable to produce the desired reduction in foam level. The oil or wax should be a low-viscosity, high-boiling liquid which is not readily dispersible in water but will spread as a thin film over the surface of the water under the conditions existing in the pot evaporator. Applicable oils and waxes are high boiling (above 250° C.) solid or liquid hydrocarbon mixtures derived from petroleum such as the paraffins (alkanes), cycloparaffins (cycloalkanes) and aromatics. While many of such mixtures as lubricating oils and fuel oils are operable, it is preferred to restrict the use of petroleum derived oils and waxes to purified materials which are colorless, tasteless and odorless. Examples of these are the refined paraffin waxes and light and heavy liquid petrolatum (mineral oils). Other operable materials are animal fat, such as lard, and edible oils of vegetable origin such as cottonseed, peanut, soybean, coconut, corn, sesame, sunflower-seed, and palm oils, and hydrogenated derivatives thereof.

Although it is not a requisite for the operation of this invention, it is desirable that the oil or wax should be compatible with the polymer being dispersed so that the properties of the final product are not significantly altered. It is for this reason that molten paraffin wax is a preferred antifoamer for use with preparing dispersions of ethylene/vinyl acetate copolymers. These are wax compatible polymers which are frequently used for fortification of paraffin waxes.

Another desirable requirement of the antifoaming agents is that they do not cause defects in coatings produced from the dispersions. The most common coating defects attributed to antifoaming agents are referred to as "fisheyes." The silicone based antifoams are well known to produce this type of defect and are thus defective for at least two reasons in the present process. Another requisite is that the antifoam does not interfere with the adhesion properties of coatings produced from the dispersion. A still further requirement is that the antifoam additive should have FDA approval for coatings in direct food contact. Paraffin wax and the vegetable oils listed previously fulfill all of these requirements.

The quantity of defoaming agent required is from 0.05–5%, preferably from 0.3–1.0% by weight, based on weight of solids in the evaporator. The preferred way is to add the antifoams continuously during the foamy period described previously using the minimum amount required to suppress the foam. This minimum amount varies considerably depending on the solvent system, type of polymer, evaporator agitator, etc.

The process of this invention is of generally utility in the preparation of aqueous dispersions of an olefin polymer by the solution dispersion method. It is particularly of use in preparing dispersions of ethylene interpolymers such as are described in U.S. Pat. 3,296,172 and my copending application Ser. No. 642,168, filed May 29, 1967.

Such useful polymers comprise 30–97% by weight copolymerized ethylene and 3–70% by weight of copolymerized units of at least one comonomer having polar characteristics. Among others, examples of monomers having polar characteristics are: vinyl alkanoates, such as vinyl formate, vinyl acetate, vinyl propionate, and vinyl butyrate; unsaturated carboxylic acids, such as acrylic acid and methacrylic acid; acrylates and methacrylates, such as methyl methacrylate, ethyl acrylate and isobutyl acrylate; and halogenated vinyl compounds, such as vinyl chloride. Copolymers of ethylene and vinyl acetate are particularly suitable in this invention. Preferably such ethylene/vinyl acetate copolymers contain 55–82% by weight of copolymerized ethylene and 18–45% by weight of copolymerized vinyl acetate. Terpolymers of ethylene containing copolymerized vinyl acetate and copolymerized acrylic acid or methacrylic acid wherein the acid content is from 0.5–10% by weight, and the combined vinyl acetate and acid content is from 18–40% by weight are also preferred copolymers. The copolymers used in this invention are generally prepared by high-pressure free-radical catalysis processes. The copolymers prepared by low-pressure coordination catalysis processes are also suitable. Exemplary patents illustrating copolymer preparation are U.S. Pat. 2,703,794 issued to Milton J. Roedel on Mar. 8, 1955; and U.S. Pat. 3,215,657 issued to Aleksander Beresniewicz et al. on Nov. 2, 1965. Molecular weight of useful copolymers can be varied over a wide range. However, the copolymers preferably have molecular weights corresponding to a melt index of from 3–150. The copolymer melt index is determined as described in ASTM-D-123A-65T using condition E for those copolymers having a melt index below about 75, and using condition A for those copolymers having a melt index in excess of 75.

Other preferred polymers are the ethylene/alpha,beta-ethylenically unsaturated carboxylic acid copolymers of from about 55–97% by weight ethylene and 3–45% by weight of an alpha,beta-ethylenically unsaturated carboxylic acid such as acrylic acid, methacrylic acid, fumaric acid, maleic acid, itaconic acid, aconitic acid, and the like. Acid derivatives of the aforesaid, such as esters, amides, anhydrides, and the like, also may be employed as monomers. While these derivatives must be convertible to a free carboxylic acid group prior to the formation of the dispersion, it is not necessary that all such derivatives be converted to free carboxyl groups. Such a copolymer has about 5–75% of the acid groups neutralized as described in U.S. Pat. 3,296,172. The preferred acid monomer is methacrylic acid.

The advantage of this invention is that by suppressing foam formation during this critical part of the evaporation, the over-all evaporation rate can be substantially increased. This has the effect of increasing the quantity of product that can be produced in an evaporator or reducing the number or size of evaporators required. In the following examples the evaporation rates are expressed in terms of weight of distillate/hr./sq. ft. of evaporator cross-sectional area. This criteria of evaporation rate is used because it has been found that in the evaporation of foamy materials, it is the available surface area of the evaporating liquid rather than the heat-exchange surface or vessel volume that controls the rate of evaporation.

A further advantage of this invention is the polymer dispersions which are produced are of superior quality due to reduced amounts of coagulated and flocculated material. Extended evaporation times caused by high foam produces aggregates or agglomerates in the polymer dispersions which detract from the appearance and utility of coatings produced from the dispersions.

The invention can be further understood by the following examples in which percentages are by weight, unless otherwise indicated.

EXAMPLE 1

Fifteen lbs. of an ethylene/vinyl acetate copolymer containing 28% vinyl acetate and having a melt index of 6 was dissolved in a solvent mixture consisting of 84.5 lbs. of cyclohexane and 10.5 lbs. of normal propyl alcohol. This polymer solution was then emulsified in a water phase consisting of 0.6 lb. of sodium dodecyl sulfate and 0.033 lb. of sodium carbonate dissolved in 48 lbs. of the water. The emulsification was done in a batch emulsification mill with a 5-minute milling time. (Model O Kady Mill manufactured by the Kinetic Dispersions Corp. of Buffalo, N.Y.) The resulting "crude" emulsion consisted of particles of polymer solution dispersed in a continuous water phase. Maximum particle size of the solution particle was 2 microns.

(a) One-gallon portions of this material were evaporated in a 1-gallon stainless steel vessel equipped with a steam jacket and an agitator. The cross-sectional area of the vessel was 0.136 sq. ft. Most of the solvents distilled off rapidly at a vapor temperature of 67–70° C. (The boiling point of the cyclohexane-n-propanol-water azeotrope being 67° C.) When the vapor temperature reached approximately 76° C., a very persistent foam was encountered which limited the rate of evaporation. The foam conditions persisted until the vapor temperature reached 96° C. The evaporation rate from 76–96° C. was 9 lbs. distillate/hr./sq. ft. of evaporator surface. Additional water was evaporated to concentrate the dispersion to 50% solids. The over-all evaporator capacity in this experiment was 4.7 lbs. of polymer solids/hr./sq. ft. of evaporator surface.

(b) The experiment described above was repeated except that when the foam condition was encountered at a vapor temperature of 76° C., one gram of paraffin wax, melting point 143–150° F., was added to the evaporator. The foam immediately disappeared and the evaporation rate could be raised by increasing steam input to the jacket. The evaporation rate over the vapor temperature of 76–96° C. was 51 lbs. of distillate/hr./sq. ft. of evaporator surface. The dispersion was concentrated further to 50% solids. The over-all evaporator capacity in this experiment was 7.1 lbs. polymer solids/hr./sq. ft. of evaporator surface representing a 50% increase in evaporator capacity.

EXAMPLE 2

Example 1(b) was repeated except that one gram of USP mineral oil was added in place of the paraffin wax. A reduction in foam was observed and an evaporation rate of 30 lbs. distillate/hr./sq. ft. was obtained over the vapor temperature range of 76–96° C. The over-all evaporator capacity in this experiment was 6.3 representing a 33% increase over Example 1(a).

EXAMPLES 3 AND 4

Using the procedure of Example 1, the additional examples in the following Table I illustrate the use of additives which were effective, which were detrimental, or which were not effective.

dispersion wherein the ethylene polymer is dissolved in at least one substantially water-immiscible solvent, the polymer solution is dispersed in water using an emulsifying agent, and the solvent is evaporated, the improvement comprising: adding to the dispersion during solvent evaporation from 0.05–5% by weight, based on the weight of solids, of at least one oil or wax selected from the group consisting of peanut oil, mineral oil, cottonseed oil and paraffin wax when the vapor temperature is from about 5–10° C. above the azeotropic boiling point of the solvent-water mixture.

2. The process of claim 1 wherein the ethylene polymer is selected from the group consisting of an ethylene/vinyl alkanoate copolymer of from about 60–82% by weight ethylene and 40–18% by weight vinyl alkanoate and an ethylene/alpha, beta-ethylenically unsaturated acid copolymer of from about 55–97% by weight ethylene and 3–45% by weight of an alpha, beta-ethylenically unsaturated, acid, the copolymer having about 5–75% of the acid groups neutralized.

3. The process of claim 2 wherein the ethylene/vinyl alkanoate copolymer is a copolymer of ethylene and vinyl acetate.

4. The process of claim 2 wherein the ethylene/alpha, beta-ethylenically unsaturated acid copolymer is a copolymer of ethylene and methacrylic acid.

5. In the process of preparing an ethylene copolymer dispersion wherein an ethylene copolymer is dissolved in a substantially water-immiscible hydrocarbon solvent and a polar liquid, the copolymer solution is dispersed in water using an emulsifying agent and the solvent and polar liquid are evaporated, the improvement comprising: adding to the dispersion during the solvent and polar

TABLE I

| Additive | Solvent evaporation rate, lbs./hr./sq. ft. vapor temp. 76–96° C. | Evaporator capacity, lbs. product/hr./sq. ft. | Percent increase in evaporator capacity | Percent solvent removal at 76° C. |
| --- | --- | --- | --- | --- |
| Example No.: | | | | |
| Control None | 10.9 | 4.4 | | 92.5 |
| 3 0.7% Peanut oil | 39.6 | 6.8 | 56 | 89 |
| 4 0.3% Cottonseed oil S/S | 62.5 | 6.8 | 56 | 87 |
| Control 1% 2-ethyl-1-hexanol | 7.5 | 4.2 | (−4) | 90.5 |
| Do 1% Beeswax | 4.6 | 3.3 | (−33) | 93 |
| Do 1,000 p.p.m., Colloid 581B silicone antifoam | 7.7 | 4.4 | 0 | 93.5 |
| Do 500 p.p.m. Sag 5440 silicone anitfoam | 10.3 | 4.7 | +7 | 93 |
| Do 1% (2,4,7,7-tetramethyl-1-5-decyne-4-7-diol) Surfynol 104 | 8.9 | 3.8 | (−13) | 93 |

EXAMPLE 5

Four hundred grams of an ethylene/methacrylic acid copolymer containing 11% methacrylic acid and having a melt index of 100, together with 20 grams of oleic acid was dissolved in a solvent mixture consisting of 1404 grams of cyclohexane and 396 grams of isopropyl alcohol. The polymer solution was emulsified in a water phase consisting of 5.91 grams of sodium hydroxide and 30 grams of 28% aqueous ammonium hydroxide in 1300 ml. of distilled water. The crude emulsion was evaporated in the agitated vessel of Example 1. Most of the solvents distilled off rapidly at a vapor temperature of 67–69° C. (The boiling point of the cyclohexane-isopropanol-water azeotrope being 66° C.) When the vapor temperature started to rise and about 80% of the solvent had been distilled, a foam condition developed in the evaporator. One gram of a paraffin wax, M.P. of 143–150° F., was added and the foam collapsed. The evaporation rate during the last portion of the solvent removal, i.e., vapor temperature from 70–96° C., was 36 lbs. distillate/hr./sq. ft. of evaporator cross-section. The evaporator capacity with this polymer was 7.25 lbs. solids/hr./sq. ft.

What is claimed is:

1. In the process of preparing an ethylene polymer liquid evaporation from 0.3–1.0% by weight, based on the weight of solids, of a liquid paraffin wax, cottonseed oil, peanut oil or mineral oil when the vapor temperature is from about 5–10° C. above the azeotropic boiling point of the solvent-polar liquid-water mixture.

References Cited

UNITED STATES PATENTS

| 2,313,144 | 3/1943 | Gomm. |
| 2,379,268 | 6/1945 | Zimmer _____ 260—28 |
| 2,595,797 | 5/1952 | Leyonmark et al. |
| 2,668,150 | 2/1954 | Luvisi _____ 252—321 |
| 3,294,728 | 12/1966 | Kuehlkamp et al. |
| 3,301,810 | 1/1967 | Hunter et al. |

OTHER REFERENCES

Bikerman—Foams: Theory and Industrial Application, Reinhold, New York (1953), pages 299–301, 322.

HOSEA E. TAYLOR, Primary Examiner

H. S. COCKERAM, Assistant Examiner

U.S. Cl. X.R.

203—20